(12) United States Patent
Mau et al.

(10) Patent No.: US 9,395,766 B2
(45) Date of Patent: Jul. 19, 2016

(54) PLUGGING DEVICE

(71) Applicants: LITE-ON ELECTRONICS (GUANGZHOU) LIMITED, Guangzhou (CN); LITE-ON TECHNOLOGY CORP., Taipei 11492 (TW)

(72) Inventors: Shu-Hua Mau, Taipei 11492 (TW); Yue-Wen Jiang, Taipei 11492 (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 966 days.

(21) Appl. No.: 13/628,201

(22) Filed: Sep. 27, 2012

(65) Prior Publication Data

US 2013/0252447 A1 Sep. 26, 2013

(30) Foreign Application Priority Data

Mar. 20, 2012 (CN) .......................... 2012 1 0073740

(51) Int. Cl.
*H01R 13/62* (2006.01)
*G06F 1/18* (2006.01)
*G11B 33/12* (2006.01)

(52) U.S. Cl.
CPC .............. *G06F 1/187* (2013.01); *G11B 33/122* (2013.01); *G11B 33/124* (2013.01)

(58) Field of Classification Search
CPC .......... H01R 29/00; H01R 31/00; H01R 9/07; H01R 13/62933; H01R 13/639; H01R 13/6275; H01R 13/6395; H01R 13/62938; H04Q 1/142; G06F 13/409

USPC ..................................................... 439/372, 43
See application file for complete search history.

(56) References Cited

U.S. PATENT DOCUMENTS

| | | | | |
|---|---|---|---|---|
| 3,836,938 A * | 9/1974 | Barrett, Jr. | ............. | H01R 13/62 439/157 |
| 4,614,389 A * | 9/1986 | Albert | .................. | H05K 7/1409 439/144 |
| 5,252,084 A * | 10/1993 | Wakata | ............ | H01R 13/62955 439/157 |
| 5,435,738 A * | 7/1995 | Isohata | ............ | H01R 13/62933 439/157 |
| 6,997,725 B2 * | 2/2006 | Stella | .................... | H01R 13/453 439/157 |
| 7,410,379 B1 * | 8/2008 | Byrne | .................. | H01R 13/652 439/215 |
| 7,862,353 B1 * | 1/2011 | Azad | ................ | H01R 13/62938 439/157 |
| 8,007,299 B2 * | 8/2011 | Murakami | ........... | H05K 7/1007 439/157 |
| 8,647,141 B2 * | 2/2014 | Lee | ...................... | H01R 13/639 439/372 |
| 9,088,102 B2 * | 7/2015 | Cai | ...................... | H01R 13/635 |

* cited by examiner

*Primary Examiner* — Abdullah Riyami
*Assistant Examiner* — Vladimir Imas
(74) *Attorney, Agent, or Firm* — Rosenberg, Klein & Lee

(57) ABSTRACT

A plugging device includes a supporting frame having two opposite side plates disposed between front and rear ends thereof, at least one slide member adapted to be connected to one side of an electronic component and connected slidably to an inner surface of one of the side plates, and an operating member having at least one lever that includes a fulcrum portion connected pivotally to one of the side plates. When the operating member is pivoted rearwardly about the fulcrum portion, the slide member together with the electronic component is driven to slide relative to the supporting frame in a forward direction for plugging a plug electrical connector of the electronic component into a socket electrical connector.

11 Claims, 13 Drawing Sheets

PLUGGING DEVICE

CROSS REFERENCE TO RELATED APPLICATION

This application claims priority of Chinese Patent Application No. 201210073740.9, filed on Mar. 20, 2012.

BACKGROUND OF THE INVENTION

1. Field of the Invention

The invention relates to a plugging device, more particularly to a plugging device that is used to plug or unplug an electronic component into or from a socket electrical connector.

2. Description of the Related Art

Currently existing portable electronic apparatus, such as a notebook computer, a tablet computer, etc., is designed to be thin and light. This sort of electronic apparatus has to accommodate various types of electronic components with different functions within a limited space. Thus, it is difficult to assemble or disassemble each electronic component to or from the narrow limited space of the electronic apparatus.

For example, to mount a hard disk drive in an accommodation groove in a bottom end of a housing of a notebook computer, a worker must first insert the hard disk into the accommodation groove via a downward opening thereof, and then push the hard disk drive to move laterally so as to plug a plug electrical connector of the hard disk drive into a socket electrical connector inside the housing. Because the accommodation groove has a limited space, and the hard disk drive has no appropriate press structure, when the worker pushes the hard disk drive laterally inside the accommodation groove, he cannot exert a uniform force on the hard disk drive so that the plug electrical connector of the hard disk cannot be accurately plugged into the socket electrical connector. Moreover, if it is desired to remove the plug electrical connector from the socket electrical connector, the worker needs the aid of a tool to push the hard disk drive so as to separate the plug electrical connector from the socket electrical connector.

SUMMARY OF THE INVENTION

Therefore, an object of the present invention is to provide a plugging device that has a simple structure and that is easy to assemble and disassemble.

Another object of the present invention is to provide a plugging device that is easy and simple to operate so that convenience and efficiency of plugging and unplugging an electronic component can be effectively enhanced to thereby reduce the operation time.

The purpose of the present invention and the solution to the conventional technical problems are achieved through employment of the below technical means. According to a disclosure of the present invention, a plugging device is provided for driving movement of an electronic component so as to plug and unplug a plug electrical connector of the electronic component to a socket electrical connector. The plugging device comprises a supporting frame, at least one slide member and an operating member. The supporting frame includes a front end for receiving the socket electrical connector, a rear end opposite to the front end, and two opposite side plates disposed between the front and rear ends. The slide member is adapted to be connected to one side of the electronic component, and is connected slidably to an inner surface of one of the side plates. The operating member includes an operating rod, and at least one lever extending transversely from the operating rod. The lever includes a fulcrum portion connected pivotally to the one of the side plates, and a resistance portion connected to the slide member. When the operating member is pivoted rearwardly about the fulcrum portion, the slide member together with the electronic component is driven to slide relative to the supporting frame in a forward direction for plugging the plug electrical connector into the socket electrical connector.

The purpose of the present invention and the solution to the conventional technical problems can be further achieved through employment of the below technical means.

When the operating member is pivoted forwardly about the fulcrum portion, the slide member together with the electronic component is driven to slide relative to the supporting frame in a rearward direction for unplugging the plug electrical connector from the socket electrical connector.

The slide member is formed with an elongate slide groove that extends in a front-rear direction. Said one of the side plates includes a guide protrusion connected slidably to the elongate slide groove.

Yet another object of this invention is to provide a plugging device that can uniformly push an electronic component to slide the same so that a plug electrical connector of the electronic component can be accurately and stably plug to or unplug from a socket electrical connector.

The plugging device comprises two slide members adapted to be connected respectively to two opposite sides of the electronic component. The slide members are connected slidably and respectively to the inner surfaces of the side plates. The operating member includes two levers extending transversely and respectively from two opposite ends of the operating rod along a same direction. The resistance portion of each lever is connected to a respective slide member. Each side plate has a pivot hole formed in the center thereof. Each lever includes a lever body connected to the operating rod. The fulcrum portion has a cylindrical shape and projects from an outer surface of the lever body. The fulcrum portion of each lever is connected pivotally to the pivot hole in a respective side plate.

The fulcrum portion of each lever has a length larger than the thickness of the respective side plate so as to extend through the pivot hole and protrude from an outer surface of the respective side plate. Each lever further includes a stop protrusion that projects from an outer periphery of the fulcrum portion and that is spaced apart from the lever body. The stop protrusion of each lever is abuttable against the outer surface of the respective side plate. The pivot hole includes a first hole portion to receive the fulcrum portion therethrough, and a second hole portion communicating with the first hole portion to receive the stop protrusion therethrough.

Each slide member is formed with a pivot notch in the center thereof. The resistance portion of each lever has a cylindrical shape and projects from an inner surface of a respective lever body. The resistance portion of each lever is connected rotatably to the pivot notch in the respective slide member. The pivot notch has a downward opening. The resistance portion extends into the pivot notch through the downward opening. The operating rod and the resistance portion are disposed oppositely relative to the fulcrum portion.

Each of the two opposite sides of the electronic component is formed with two engaging holes spaced apart in a front-rear direction. Each slide member includes two engaging studs respectively disposed on front and rear sides of the pivot notch for engaging the engaging holes, respectively.

Each slide member is formed with two elongate slide grooves respectively disposed on front and rear sides of the pivot notch. Each elongate slide groove extends in a front-rear direction. Each side plate further has two guide protrusions projecting from the inner surface thereof and respectively disposed on front and rear sides of the pivot hole. The guide protrusions are connected slidably and respectively to the elongate slide grooves. Each elongate slide groove has a groove wall formed with a cutout. Each guide protrusion extends into a respective elongate slide groove through the cutout.

A still another object of the present invention is to provide a plugging device that can stably plug an electronic component to a socket electrical connector without using screws.

Each side plate further has a positioning hole proximate to the rear end. The operating rod includes two resilient plates respectively disposed on the two opposite ends thereof, and two engaging pieces respectively projecting from outer sides of the resilient plates. Each engaging piece is removably engaged to the positioning hole in the respective side plate. Alternatively, one of the side plates may be formed with a positioning hole proximate to the rear end, and the operating rod includes an engaging piece removably engaged to the positioning hole.

Through the aforesaid technical means, the advantages and effectiveness of the plugging device of the present invention reside in that the operation of the plugging device of this invention is easy and simple, so that the convenience and efficiency of plugging or unplugging the electronic component 1 can be enhanced to thereby reduce the operation time. A uniform pushing force can be exerted on the electronic component to slide the same, so that a plug electrical connector of the electronic component can accurately and stably plug into or unplug from the socket electrical connector. The plugging device has simple structure and easy to assemble and disassemble. Further, the electronic component 1 can be stably fixed in the plugging position without the use of screws.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of one preferred embodiment in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Figure 1:
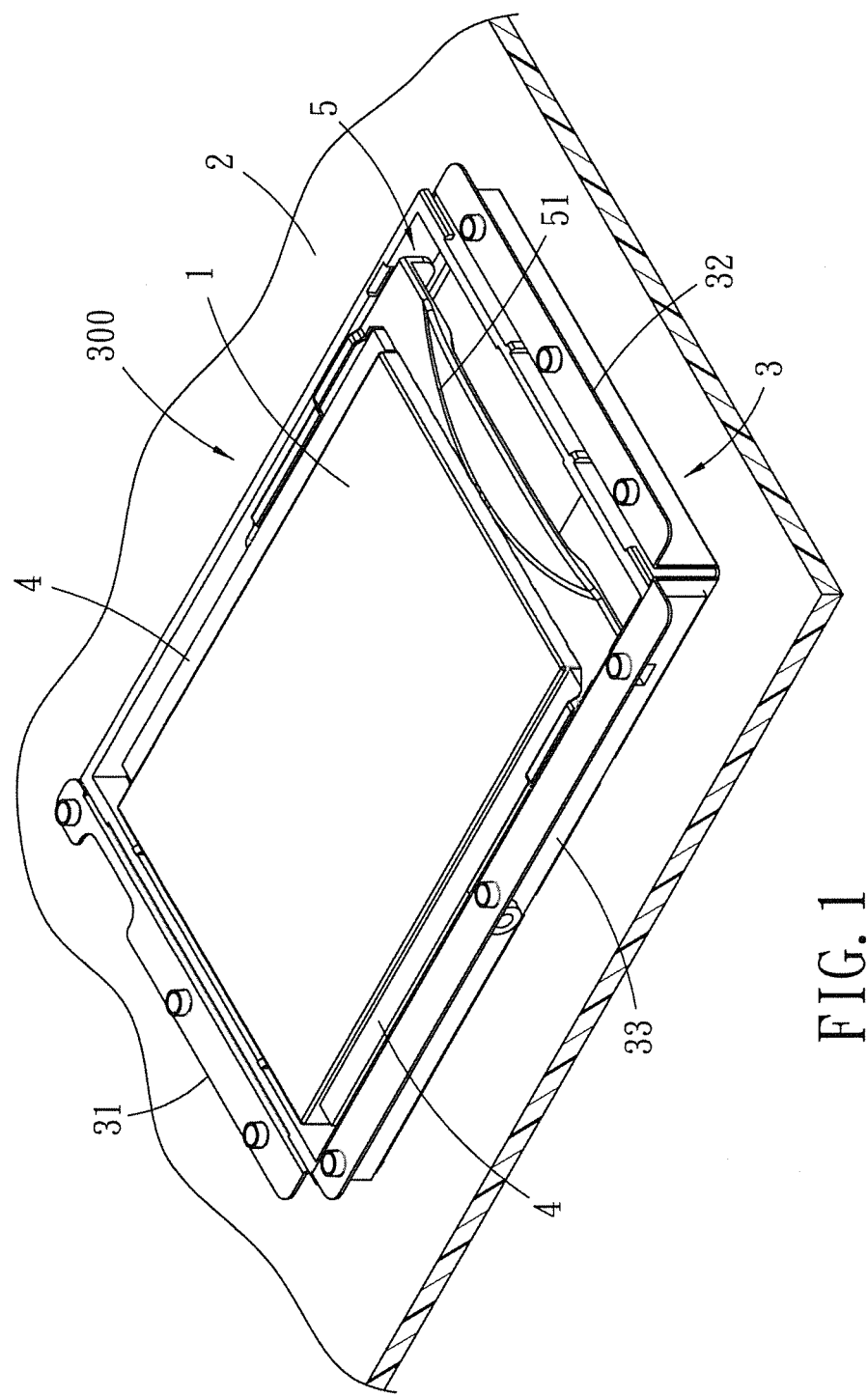
FIG. 1 is a perspective view of a plugging device according to the preferred embodiment of the present invention disposed on a circuit board.
Figure 2:
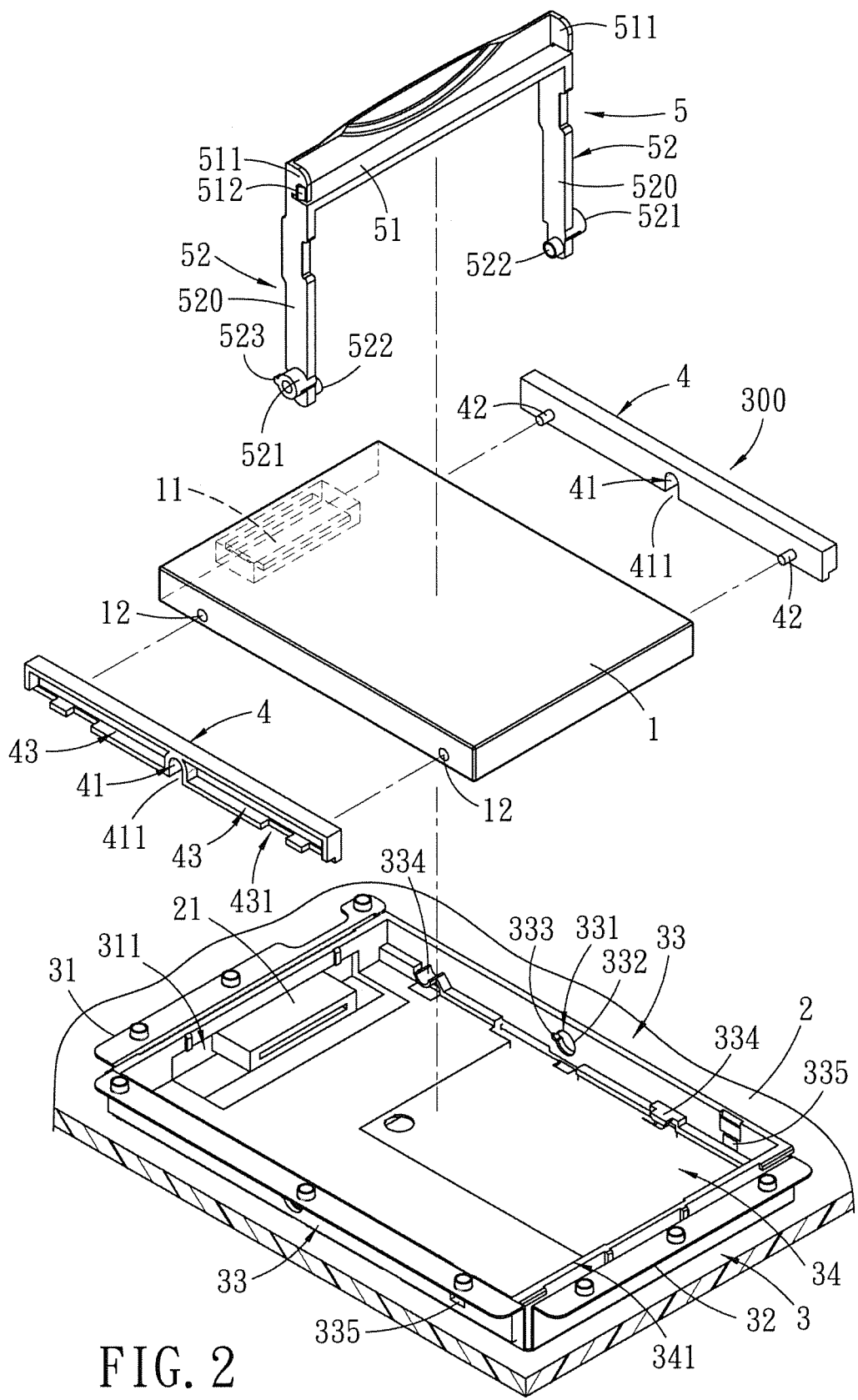
FIG. 2 is an exploded perspective view of the preferred embodiment.

Referring to FIGS. 1 and 2, a plugging device 300 according to the preferred embodiment of this invention is adapted to be disposed inside a portable electronic apparatus, such as a notebook computer or a tablet computer. The plugging device 300 is adapted to move an electronic component 1 so that a plug electrical connector 11 of the electronic component 1 is plugged into a socket electrical connector 21 of a circuit board 2. In this embodiment, the electronic component 1 is exemplified as a hard disk drive, and the circuit board 2 is exemplified as a motherboard mounted in a housing of the portable electronic apparatus. However, the electronic component 1 may also be an optical disc drive.

The plugging device 300 comprises a supporting frame 3, at least one slide member 4, and an operating member 5. The supporting frame 3 is disposed on the circuit board 2, and includes a front end 31, a rear end 32, and two side plates 33 disposed between the front and rear ends 31, 32. The slide member 4 is connected to one side of the electronic component 1, and is connected slidably to a corresponding one of the side plates 33. The operating member 5 includes an operating rod 51, and at least one lever 52 extending from the operating rod 51. The lever 52 includes a fulcrum portion 521 pivoted to the corresponding side plate 33, and a resistance portion 522 connected to the slide member 4. Through the disposition of the supporting frame 3, the slide member 4 and the operating member 5, the overall structure of the plugging device 300 is simple and is easy to assemble and disassemble.

When the operating member 5 is pivoted about the fulcrum portion 521 in a clockwise direction (V) (see FIG. 11), the slide member 4 and the electronic component 1 is pushed to move slidably along a forward direction (I) (see FIG. 12) relative to the supporting frame 3 so as to plug the plug electrical connector 11 into the socket electrical connector 21. When the operating member 5 is pivoted about the fulcrum portion 521 in a counterclockwise direction (VI) (see FIG. 14), the slide member 4 and the electronic component 1 is pushed to move slidably along a rearward direction (II) (see FIG. 15) relative to the supporting frame 3 so as to unplug the plug electrical connector 11 from the socket electrical connector 21. By pivoting the operating member 5 to push the slide member 4 and the electronic component 1 to move slidably relative to the supporting frame 3, the plug electrical connector 11 can be plugged into or unplugged from the socket electrical connector 21. Hence, the operation of the present invention is easy and simple, so that convenience and efficiency of plugging and unplugging the plug electrical connector 11 into and from the socket electrical connector 21 can be effectively enhanced, thereby reducing the operation time.

Below is a description of the detailed structure of the plugging device 300 and the connection and mode of operation between the plugging device 300 and the electronic component 1.

With reference to FIGS. 1 and 2, in this embodiment, the supporting frame 3 is fixed to the circuit board 2, for example, by using a screw-fastening method. The supporting frame 3 defines an accommodation space 34 having an opening 341 that faces upward. The slide member 4 and the electronic component 1 are mounted removably in the accommodation space 34 through the opening 341. The front end 31 of the supporting frame 3 is formed with a front opening 311 communicating with the accommodation space 34. The socket electrical connector 21 of the circuit board 2 extends partially into the accommodation space 34 through the front opening 311 for mating with the plug electrical connector 11 of the electronic component 1. It is worth to mention that, although the supporting frame 3 is exemplified as being fixed to the circuit board 2 in this embodiment, the supporting frame 3 may be directly fixed to a housing of a portable electronic apparatus.

In this embodiment, the plugging device 300 comprises two slide members 4 connected respectively to two opposite sides of the electronic component 1. The slide members 4 are connected slidably and respectively to inner surfaces of the side plates 33. The operating member 5 includes two levers 52 extending respectively and transversely from two opposite ends of the operating rod 51 along a same direction. Each of the levers 52 includes a fulcrum portion 521 connected pivotally to a respective side plate 33, and a resistance portion 522 connected to a respective slide member 4. Through the two slide members 4, the operating member 5 can exert a uniform force on the electronic component 1 to slide the same so that the plug electrical connector 11 of the electronic component 1 can accurately and stably plugged into or unplugged from the socket electrical connector 21 of the circuit board 2. It is worth to mention that the number of the slide member 4 and the number of the lever 52 of the operating member 5 may be one, respectively.

Each side plate 33 of the supporting frame 3 has a pivot hole 331 formed in the center thereof. The operating member 5 has a substantially inverted U-shaped cross section. Each lever 52 of the operating member 5 further includes a lever body 520 connected to the operating rod 51. In this embodiment, the lever body 520 is integrally connected as one piece with the operating rod 51. The fulcrum portion 521 has a cylindrical shape, and projects from an outer surface of the lever body 520. To connect pivotally the levers 52 to the respective side plates 33 of the connecting frame 3, the lever bodies 520 of the levers 52 are pressed toward each other so as to deform, and are then inserted into the accommodation space 34 through the opening 341 such that the fulcrum portions 521 of the levers 52 are registered respectively with the pivot holes 331. The lever bodies 520 are then released from being pressed to restore to their normal positions and to insert the fulcrum portions 521 into the respective pivot holes 331. Hence, the levers 52 are easily and quickly connected pivotably to the side plates 33 of the supporting frame 3.

To prevent removal of the fulcrum portions 521 from the respective pivot holes 331 during pivoting movement of the operating member 5 about the fulcrum portions 521 relative to the side plates 33, in this embodiment, the length of each fulcrum portion 521 is larger than the thickness of the respective side plate 33, so that each fulcrum portion 521 can extend through the respective pivot hole 331 and partially protrude from an outer surface of the respective side plate 33. Further, each lever 52 further includes a stop protrusion 523 projecting from an outer periphery of a respective fulcrum portion 521 and spaced apart from the lever body 520. The stop protrusion 523 is abuttable against the outer surface of the respective side plate 33 so as to interfere with the same, so that removal of the fulcrum portions 521 from the respective pivot holes 331 can be prevented during pivoting movement of the operating member 5.

Concretely speaking, the pivot hole 331 of each side plate 33 includes a first hole portion 332, and a second hole portion 333 communicating with one side of the first hole portion 332. The first hole portion 333 has a shape matching that of the fulcrum portion 521 to receive the fulcrum portion 521 therethrough. The second hole portion 333 has a shape matching that of the stop protrusion 523 to receive the stop protrusion 523 therethrough. When the fulcrum portion 521 and the stop protrusion 523 of each lever 52 are brought to register with the first hole portion 332 and the second hole portion 333 of the respective side plate 33, the fulcrum portion 521 and the stop protrusion 523 can extend out of the outer surface or retract into the inner surface of the corresponding side plate 33 through the first and second hole portions 332, 333, respectively. As such, the stop protrusion 523 of each lever can be ensured to maintain interference with the corresponding side plate 33 when it is pivoted to other angular positions. Hence, removal of the fulcrum portions 521 from the respective pivot holes 331 can be prevented.

Each of the slide members 4 is formed with a pivot notch 41 in the center thereof. The resistance portion 522 of each lever 52 has a cylindrical shape, and projects from an inner surface of the lever body 520. The resistance portion 522 is connected rotatably to the pivot notch 41. Through this, during pivoting movement of the operating member 5 about the fulcrum portions 521 relative to the side plates 33, through the engaging relations between the resistance portions 522 of the levers 52 and the pivot notches 41 of the respective slide members 4, the slide members 4 are pushed simultaneously so that the slide members 4 can move the electronic component 1 to slide therealong. Further, the pivot notch 41 has a downward opening 411. During assembly, the downward openings 411 of the pivot notches 41 are brought to align with the resistance portions 522 of the levers 52, after which the levers 52 are moved downward so as to extend the resistance portions 522 into the pivot notches 41 through the downward openings 411 thereof, thereby assembling the slide members 4 to the levers 52. Therefore, convenience of assembly between the slide members 4 and the levers 52 can be enhanced.

In this embodiment, the operating rod 51 and the resistance portions 522 are disposed on two opposite sides of the fulcrum portions 521. That is, the fulcrum portions 521 are disposed between the operating rod 51 and the resistance portions 522. When the operating rod 51 is pushed rearward, the operating member 5 pivots about the fulcrum portions 521 in the clockwise direction (V) (see FIG. 11), so that the resistance portions 522 of the levers 52 push the slide members 4 to slide along the forward direction (I) (see FIG. 12) relative to the supporting frame 3. When the operating rod 51 is pushed forward, the operating member pivots about the fulcrum portions 521 in the counterclockwise direction (VI) (see FIG. 14), so that the resistance portions 522 push the slide members 4 to slide along the rearward direction (II) (see FIG. 15) relative to the supporting frame 3.

It is worth to mention that, coping with the different specifications and sizes of the electronic components 1, the resistance portions 522 may be disposed above the fulcrum portions 521. That is, each resistance portion 522 may be disposed between the operating rod 51 and the corresponding fulcrum portion 521 to form another type of lever structure. Through the aforesaid configuration, when the operating member is pivoted in the clockwise direction (V), the resistance portions 522 will push the slide members 4 to slide along the rearward direction (II) relative to the supporting frame 3. When the operating member 5 is pivoted about the fulcrum portions 521 in the counterclockwise direction (VI), the resistance portions 522 will push the slide members 4 to slide along the forward direction (I) relative to the supporting frame 3.

More concretely speaking, in this embodiment, each of the two opposite sides of the electronic component 1 is formed with two engaging holes 12 spaced apart in a front-rear direction. Each slide member 4 includes two engaging studs 42 that are provided on an inner surface thereof. The engaging studs 42 are disposed respectively on two opposite sides of the pivot notch 41 to engage the engaging holes 12, respectively. Through the aforesaid structural configuration, when the operating member 5 pushes the slide members 4 to slide along the forward direction (I) or the rearward direction (II), front or rear end of each slide member 4 will not warp relative to the electronic component 1, so that the slide members 4 can be connected stably to the electronic component 1 and can stably move the electronic component 1 to slide therealong.

Each slide member 4 further includes two elongate slide grooves 43 formed in an outer surface thereof and disposed respectively on the two opposite sides of the pivot notch 41. Each elongate slide groove 43 extends in a front-rear direction. Each side plate 33 includes two guide protrusions 334 protruding from the inner surface thereof and disposed respectively on front and rear sides of the pivot hole 331. The guide protrusions 334 of each side plate 33 are connected slidably and respectively to the elongate slide grooves 43 of the respective slide member 4. Through the aforesaid structural configuration, when the operating member 5 pushes the slide members 4 to slide along the forward direction (I) or the rearward direction (II), each slide member 4 can slide stably relative to the respective side plate 33, and the front or rear end of each slide member 4 will not warp relative to the electronic component 1, so that the slide members 4 can be connected slidably, stably and respectively to the side plates 33 and can move the electronic component 1 to slide therealong.

Moreover, a groove wall of each elongate slide groove 43 is formed with a cutout 431. Each guide protrusion 334 extends into a respective elongate slide groove 43 through the cutout 431. When the slide members 4 are moved downward and assembled to the resistance portions 522 of the levers 52, each guide protrusion 334 extends simultaneously into the respective elongate slide groove 43 through the cutout 431. As such, convenience of assembly among the slide members 4, the operating member 5 and the side plates 33 can be enhanced. It is worth to mention that the number of the elongate slide groove 43 of each slide member 4 and the number of the guide protrusion 334 of each side plate 33 may be one, respectively. The effect of guiding the slide members 4 to slide along the forward direction (I) or the rearward direction (II) can be similarly achieved.

Figure 3:
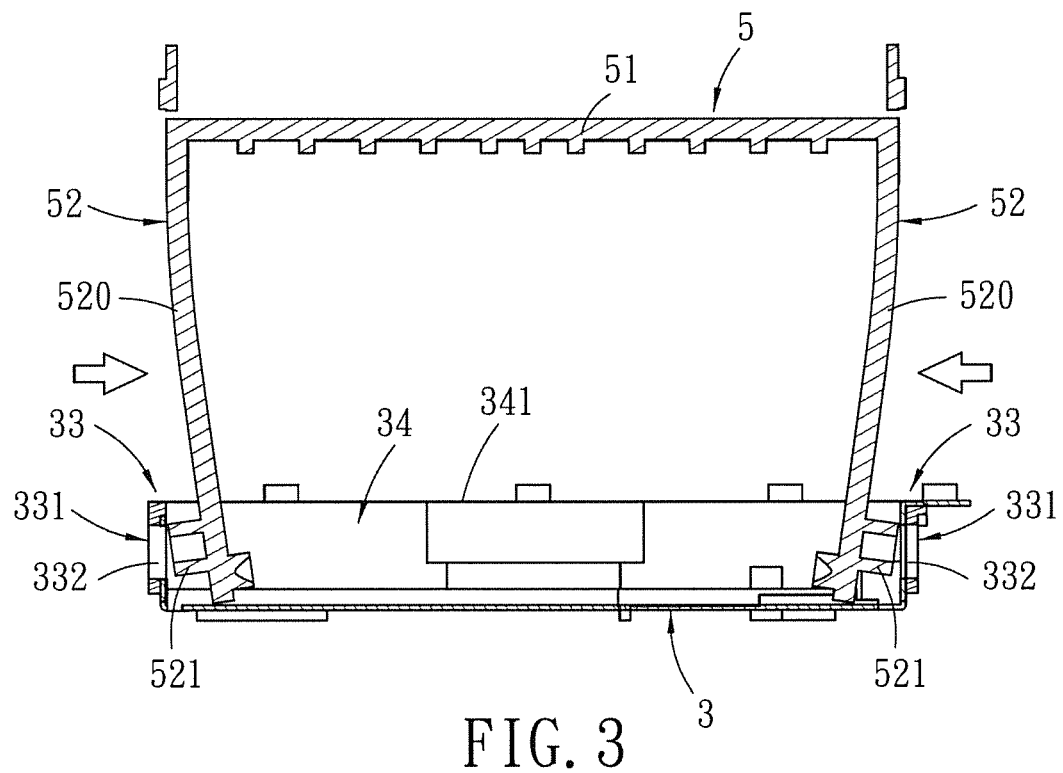
FIG. 3 is a sectional view of the preferred embodiment in an assembled state.
Figure 4:
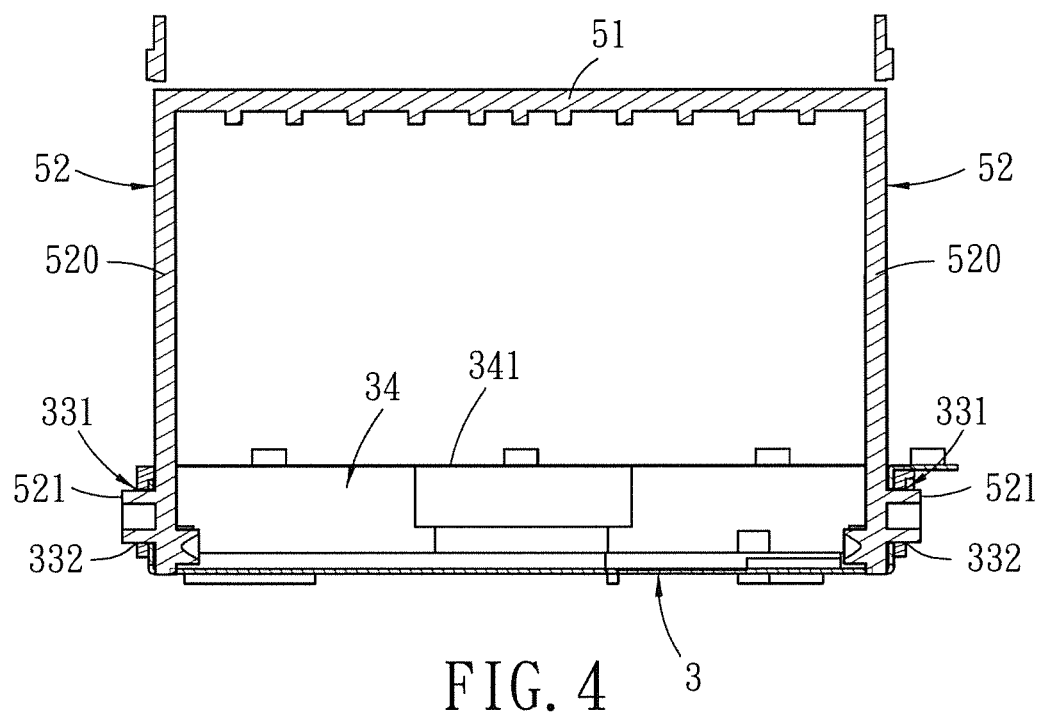
FIG. 4 is a view similar to FIG. 3, but illustrating fulcrum portions of two levers of an operating member being respectively pivoted to pivot holes in two side plates.
Figure 5:
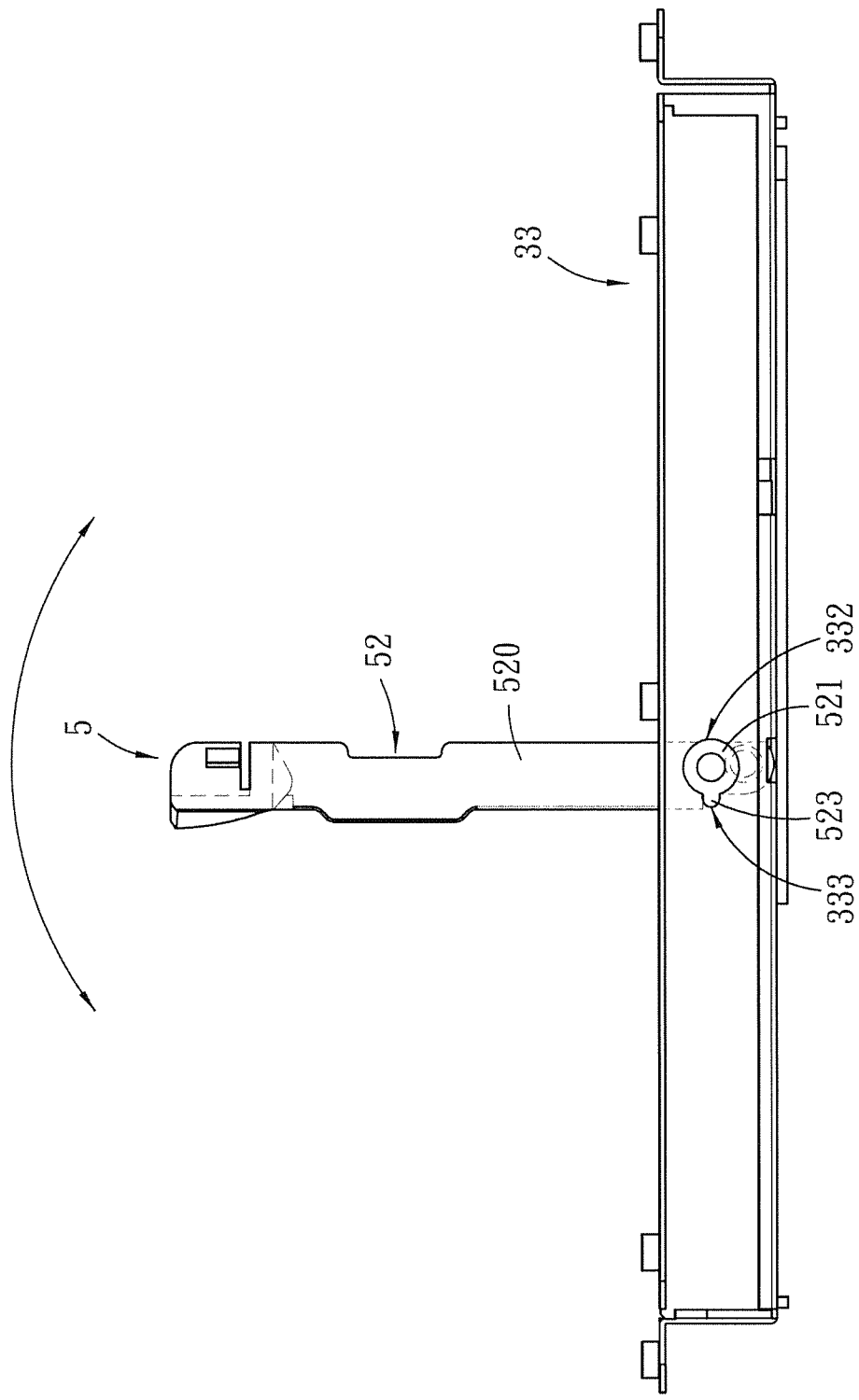
FIG. 5 is a schematic side view of the preferred embodiment, illustrating a fulcrum portion and a stop protrusion extending out of a plate body through respective first and second hole portions of the pivot hole.

As shown in FIGS. 3 to 5, to assemble the plugging device 300 and the electronic component 1 (see FIG. 2), the lever bodies 520 of the levers 52 are first pressed toward each other, after which the operating member 5 is moved downward so that the levers 52 extend into the accommodation space 34 through the opening 341 and the fulcrum portions 521 and the stop protrusions 523 of the levers 52 are registered with the first hole portions 332 and the second hole portions 333 of the pivot holes 331, respectively. Then, the lever bodies 520 are released from being pressed so that the fulcrum portions 521 and the stop protrusions 523 extend through the first hole portions 332 and the second hole portions 333, respectively, and out of the outer surfaces of the side plates 33. At this time, the operating member 5 is assembled to the side plates 33 of the supporting frame 3.

Figure 6:
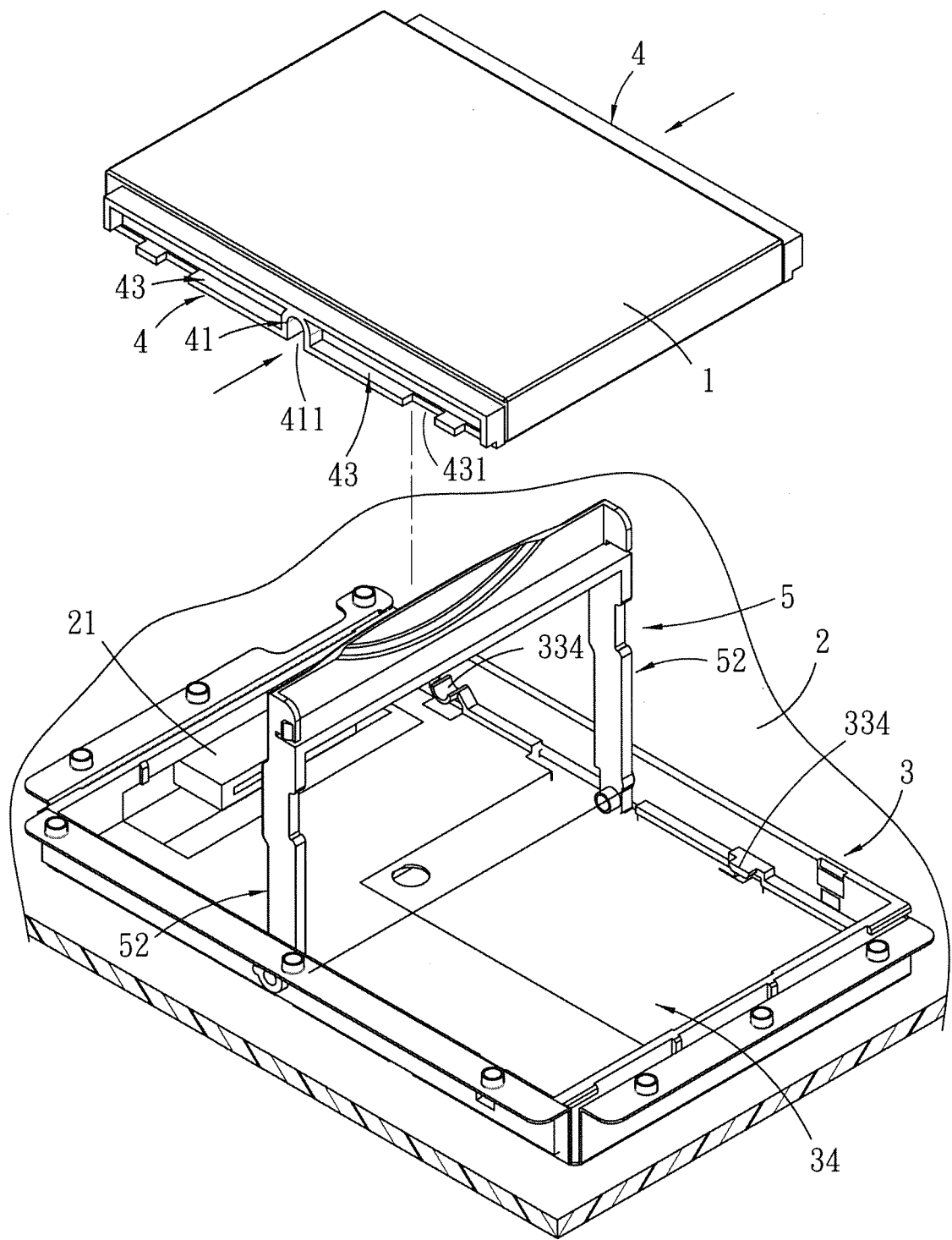
FIG. 6 is a partly exploded perspective view of the preferred embodiment, illustrating how the operating member is connected to a supporting frame and slide members to an electronic component.
Figure 7:
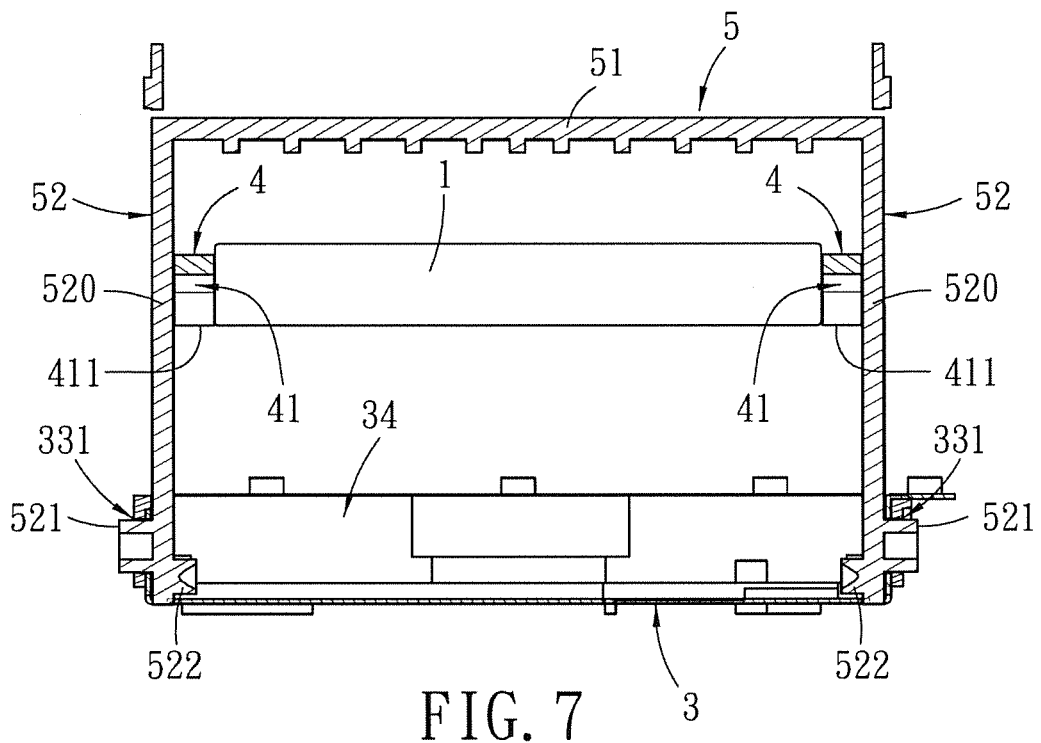
FIG. 7 is a sectional view of the preferred embodiment, illustrating how the slide members together with the electronic component are disposed between the levers.

As shown in FIGS. 6 and 7, the two slide members 4 are respectively assembled to the two opposite sides of the electronic component 1 such that the engaging studs 42 (see FIG. 2) of each slide member 4 are engaged to the engaging holes 12 (see FIG. 2) in the corresponding side of the electronic component 1. Subsequently, an assembly of the slide members 4 and the electronic component 1 is disposed between the levers 52 of the operating member 5 such that the downward openings 411 of the pivot notches 41 are aligned with the respective resistance portions 522 and the cutouts 431 of the elongate slide grooves 43 are aligned with the respective guide protrusions 334.

Figure 8:
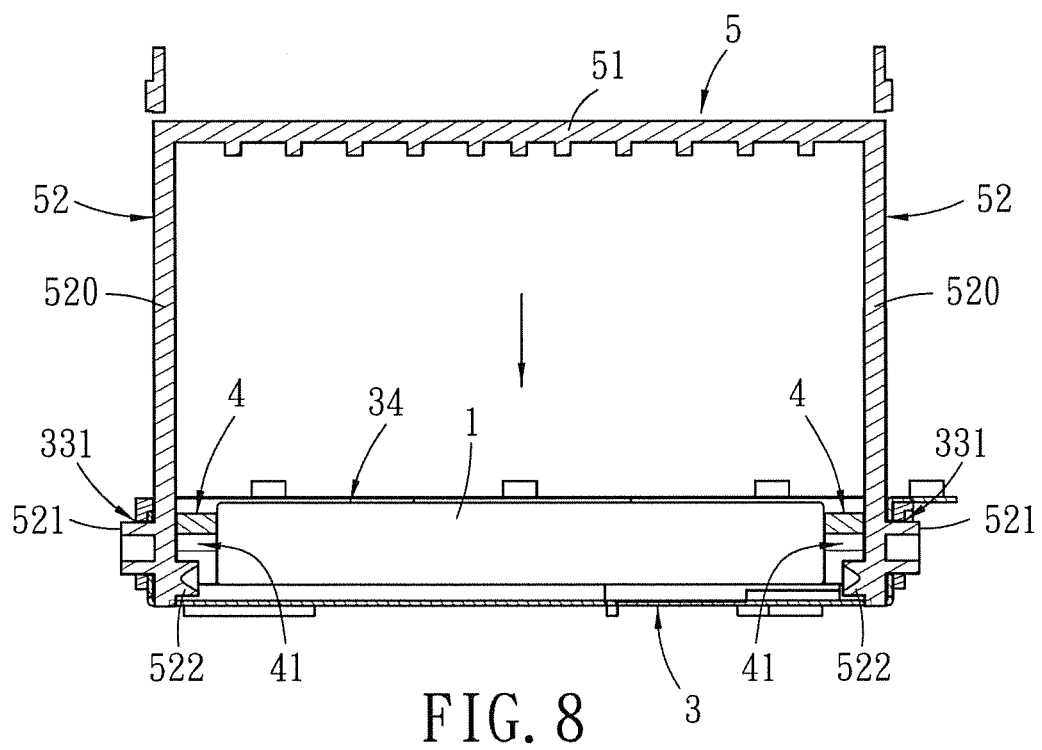
FIG. 8 is a sectional view of the preferred embodiment, illustrating resistance portions of the levers respectively extending into two pivot notches of the slide members through downward openings thereof.
Figure 9:
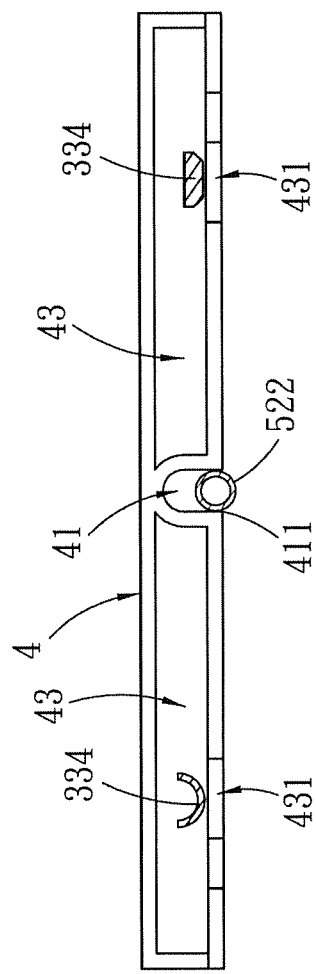
FIG. 9 is a schematic side view of the preferred embodiment, illustrating the resistance portion extends into the pivot notch through the downward opening thereof.
Figure 10:
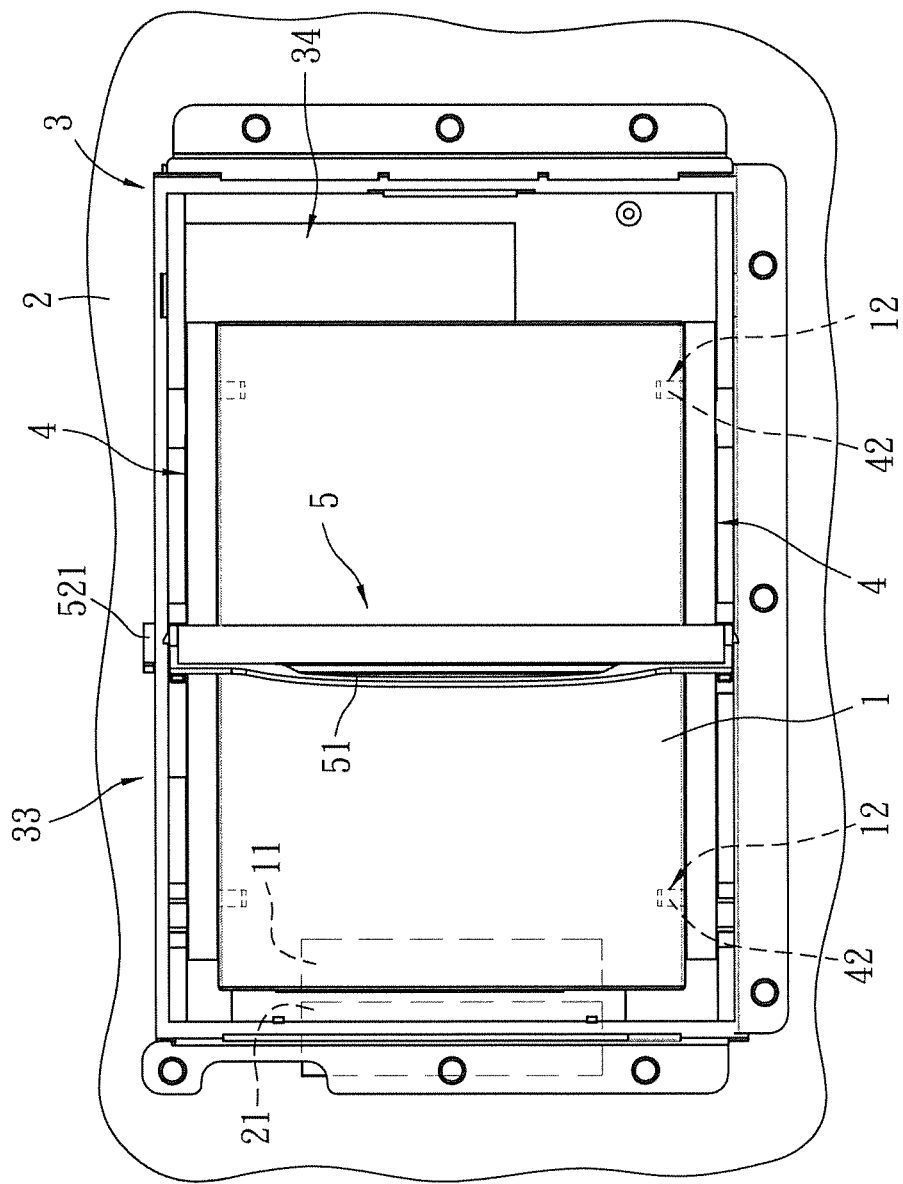
FIG. 10 is a schematic side view of the preferred embodiment, illustrating how the slide members are engaged to two opposite sides of the electronic component.

As shown in FIGS. 8 to 10, the assembly of the slide members 4 and the electronic component 1 is moved downward so as to be disposed in the accommodation space 34 through the opening 341. When the resistance portions 522 of the levers 52 extend into the pivot notches 41 through the downward openings 411 to engage the same, and the guide protrusions 334 extend into the respective elongate slide grooves 43 through the cutouts 431, the slide members 4 are simultaneously assembled to the levers 52 of the operating member 5 and the side plates 33 of the supporting frame 3. At this time, the assembly between the plugging device 300 and the electronic component 1 is completed.

Figure 11:
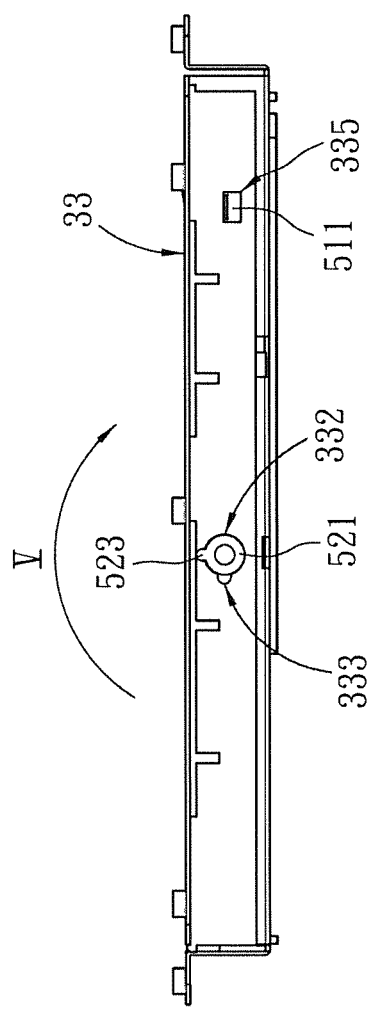
FIG. 11 is a schematic side view of the preferred embodiment, illustrating how the operating member pivots in a clockwise direction about the fulcrum portion relative to the supporting frame.
Figure 12:
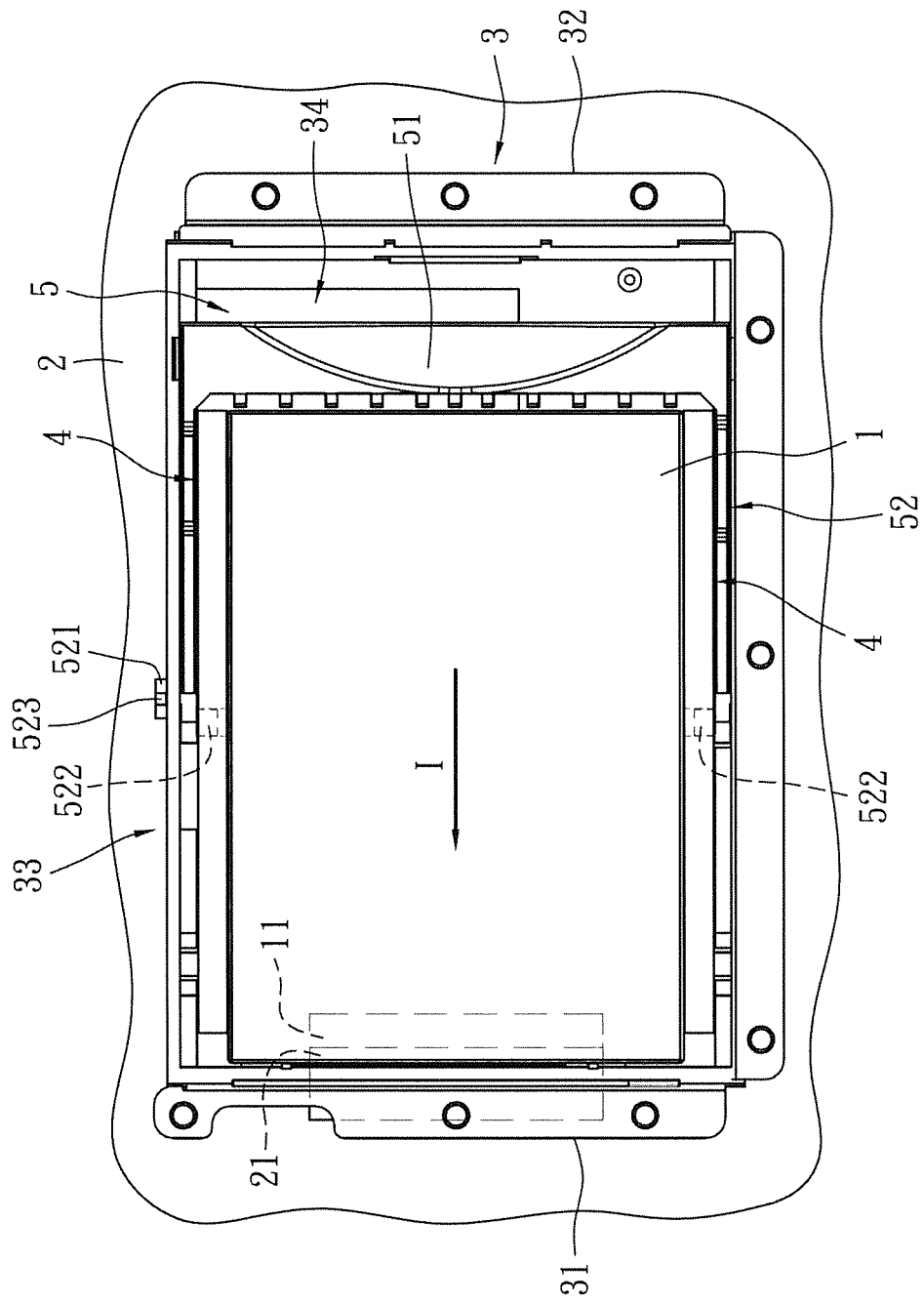
FIG. 12 is a schematic top view of the preferred embodiment, illustrating how the resistance portions push the slide members to slide forwardly to plug the plug electrical connector into the socket electrical connector when the operating member is pivoted in the clockwise direction about the fulcrum portions relative to the supporting frame.

As shown in FIGS. 10 to 12, to plug the plug electrical connector 11 of the electronic component 1 into the socket electrical connector 21 of the circuit board 2, the operating rod 51 of the operating member 5 is pushed rearward so that the operating member 5 pivots about the fulcrum portions 521 in the clockwise direction (V). The resistance portions 522 of the levers 52 will push the slide members 4 to slide along the forward direction (I) (see FIG. 12) relative to the supporting frame 3. The slide members 4, in turn, move the electronic component 1 to slide therealong so that the plug electrical connector 11 approaches the socket electrical connector 21. When the operating member 5 is pivoted into the accommodation space 34 to a collapsed position, as shown in FIG. 12, the plug electrical connector 11 of the electronic component 1 is plugged into the socket electrical connector 21. At this time, the plug electrical connector 11 and the socket electrical connector 21 are coupled electrically to each other to transmit an electrical signal.

As shown in FIGS. 1, 2 and 11, to stably fix the electronic component 1 in a plugging position, in this embodiment, each side plate 33 further has a positioning hole 335 proximate to the rear end 32 thereof, and the operating rod 51 includes two resilient plates 511 provided respectively on two opposite ends thereof, and two engaging pieces 512 projecting respectively from outer sides of the resilient plates 511. Each of the engaging pieces 512 is engaged removably to the positioning hole 335 in the respective side plate 33. When the operating member 5 is pivoted to the collapsed position shown in FIG. 12, the engaging pieces 512 of the operating rod 51 will engage the respective positioning holes 335 so that the operating member 5 is engaged stably to the side plates 33, thereby preventing removal of the engaging pieces 512 from the respective positioning holes 335 when the portable electronic apparatus falls off or vibrates. Hence, the operating member 5 can stably fix the electronic component 1 in the plugging position. It is worth to mention that the number of the engaging piece 512 of the operating member 5 and the number of the positioning hole 335 in the supporting frame 3 can be one, respectively. The effect of fixing the operating member 5 to the side plates 33 can be similarly achieved.

Figure 13:
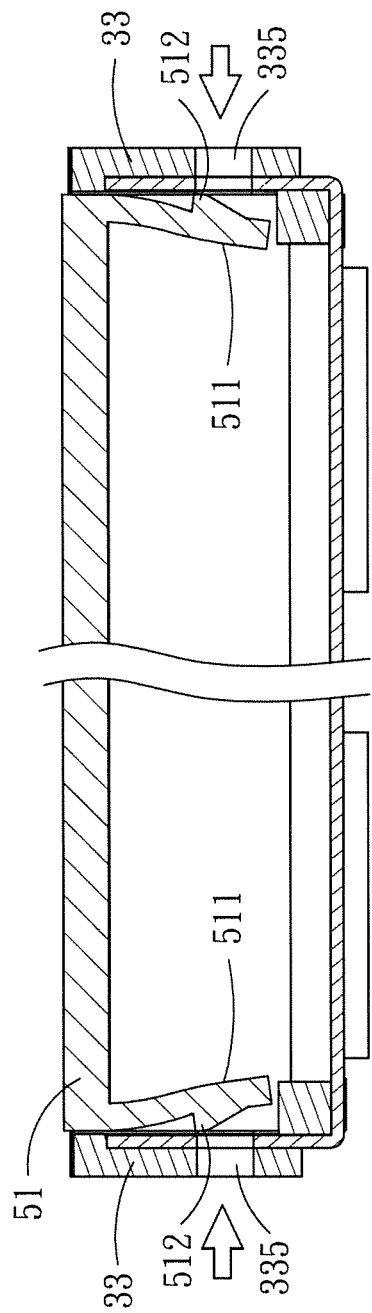
FIG. 13 is a fragmentary sectional view of the preferred embodiment, illustrating how two engaging pieces of the operating member are pressed inward to disengage from two positioning holes, respectively.
Figure 14:
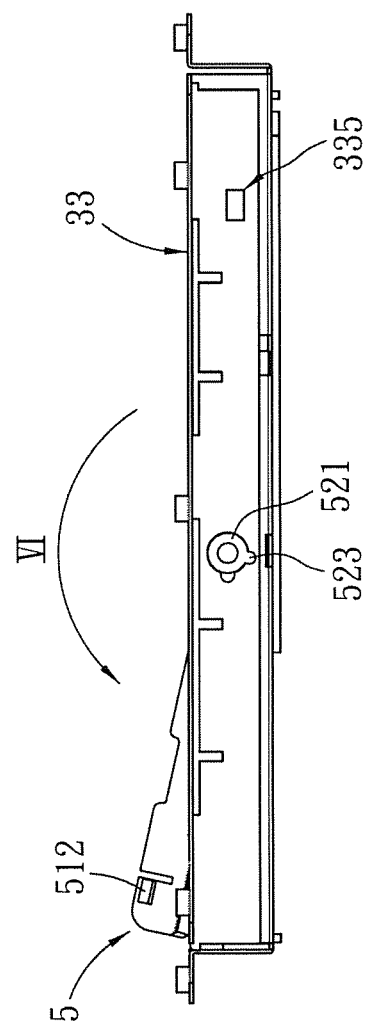
FIG. 14 is a view similar to FIG. 11, but illustrating the operating member being pivoted about the fulcrum portions relative to the supporting frame in a counterclockwise direction.
Figure 15:
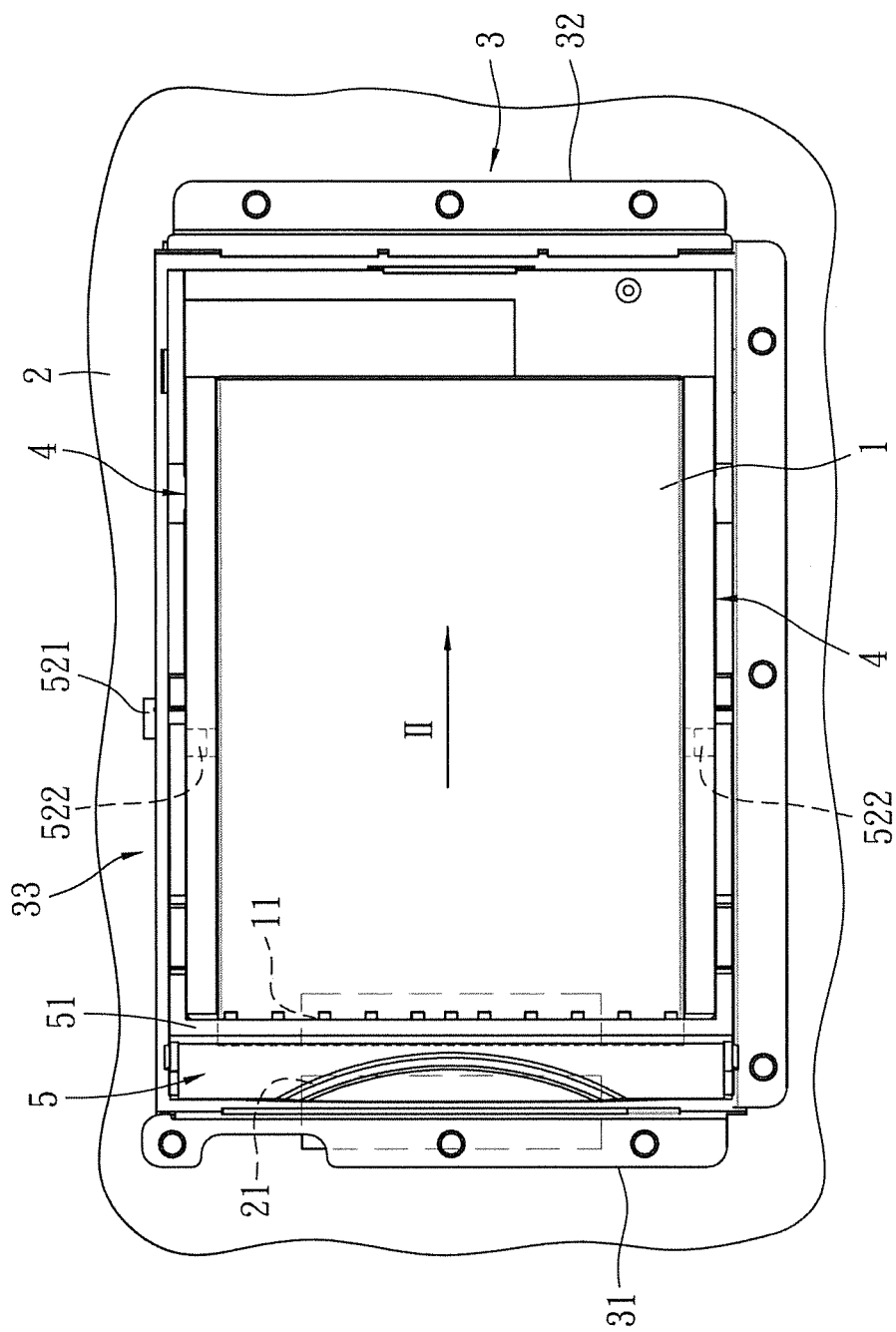
FIG. 15 is a view similar to FIG. 12, but illustrating how the resistance portions push the slide members to slide rearwardly to unplug the plug electrical connector from the socket electrical connector when the operating member is pivoted in the counterclockwise direction about the fulcrum portions relative to the supporting frame.

As shown in FIGS. 13 to 15, to unplug the plug electrical connector 11 of the electronic component 1 from the socket electrical connector 21 of the circuit board 2, the two engaging pieces 512 are pushed inward from the outer sides of the respective positioning holes 335 to deform the resilient plates 511 that causes the resilient plates 511 to move toward each other and to disengage from the positioning holes 335, thereby disengaging the operating member 5 from the side plates 33. At this time, the operating rod 51 of the operating member 5 is pushed upward, and the operating member 5 pivots about the fulcrum portions 521 in the counterclockwise direction (VI). During pivoting movement of the levers 52, the resistance portions 522 of the levers 52 will push the slide members 4 to slide along the rearward direction (II) (see FIG. 15) relative to the supporting frame 3. The slide members 4, in turn, move the electronic component 1 to slide therealong so that the plug electrical connector 11 is moved gradually away from the socket electrical connector 21. When the operating member 5 is pivoted to a position, as shown in FIG. 15, the plug electrical connector 11 of the electronic component 1 is unplugged from the socket electrical connector 21.

In sum, by pushing the operating rod 51 of the operating member 5 to pivot the two levers 52, the resistance portions 522 of the levers 52 can exert uniform pushing force on the two opposite sides of the electronic component 1 through the slide members 4 to slide the electronic component 1 during pivoting movement of the levers 52, so that the plug electrical connector 11 of the electronic component 1 can accurately and stably plug into or unplug from the socket electrical connector 21 of the circuit board 2. Further, by pivoting the operating member 5 along the clockwise direction (V) or the counterclockwise direction (VI), the slide members 4 can move the electronic component 1 to slide therealong so as to plug or unplug the plug electrical connector 11 of the electronic component 1 into or from the socket electrical connector 21 of the circuit board 2. Hence, the operation of the plugging device 300 of the present invention is easy and simple, so that the convenience and efficiency of plugging or unplugging the electronic component 1 can be enhanced to thereby reduce the operation time. Moreover, through the disposition of the supporting frame 3, the slide members 4 and the operating member 5, the overall structure of the plugging device 300 is simple and is easy to assemble and disassemble. Additionally, when the operating member 5 is in the collapsed position, the engaging pieces 512 of the operating rod 51 are engaged respectively to the positioning holes 335 so that the operating member 5 can be stably connected to the side plates 33. As such, the electronic component 1 can be stably fixed in the plugging position without the use of screws. Therefore, the objects of this invention can be served.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A plugging device for driving movement of an electronic component so as to plug and unplug a plug electrical connector of the electronic component into and from a socket electrical connector, said plugging device comprising:

a supporting frame including a front end for receiving the socket electrical connector, a rear end opposite to said front end, and two opposite side plates disposed between said front and rear ends;

two slide members adapted to be connected respectively to two opposite sides of the electronic component, said slide members being connected slidably and respectively to inner surfaces of said side plates; and an operating member including an operating rod, and two levers extending transversely and respectively from two opposite ends of said operating rod along a same direction, each of said levers including a lever body connected to said operating rod, a fulcrum portion having a cylindrical shape and projecting from an outer surface of said lever body, and a resistance portion connected to a respective one of said slide members, each of said side plates having a pivot hole formed in the center thereof, said fulcrum portion of each of said levers being connected pivotally to said pivot hole in a respective one of said side plates;

when said operating member is pivoted rearwardly about said fulcrum portion, said slide members together with the electronic component are driven to slide relative to said supporting frame in a forward direction for plugging the plug electrical connector into the socket electrical connector; and when said operating member is pivoted forwardly about said fulcrum portion, said slide members together with the electronic component are driven to slide relative to said supporting frame in a rearward direction for unplugging the plug electrical connector from the socket electrical connector;

wherein said fulcrum portion of each of said levers has a length larger than the thickness of said respective side plate so as to extend through said pivot hole and protrude from an outer surface of said respective side plate, each of said levers further including a stop protrusion that projects from an outer periphery of said fulcrum portion and that is spaced apart from said lever body, said stop protrusion of each of said levers being abuttable against said outer surface of said respective side plate, said pivot hole including a first hole portion to receive said fulcrum portion therethrough, and a second hole portion communicating with said first hole portion to receive said stop protrusion therethrough.

2. The plugging device as claimed in claim 1, wherein each of said slide members is formed with an elongate slide groove that extends in a front-rear direction, each of said side plates including a guide protrusion connected slidably to said elongate slide groove of a respective one of said slide members.

3. The plugging device as claimed in claim 1, wherein each of said slide members is formed with a pivot notch in the center thereof, said resistance portion of each of said levers having a cylindrical shape and projecting from an inner surface of a respective said lever body, said resistance portion of each of said levers being connected rotatably to said pivot notch in said respective slide member.

4. The plugging device as claimed in claim 3, wherein said pivot notch has a downward opening, said resistance portion extending into said pivot notch through said downward opening.

5. The plugging device as claimed in claim 3, wherein said operating rod and said resistance portion are disposed oppositely relative to said fulcrum portion.

6. The plugging device as claimed in claim 3, each of the two opposite sides of the electronic component is formed with two engaging holes spaced apart in a front-rear direction, wherein each of said slide members includes two engaging studs respectively disposed on front and rear sides of said pivot notch for engaging said engaging holes, respectively.

7. The plugging device as claimed in claim 3, wherein each of said slide members is formed with two elongate slide grooves respectively disposed on front and rear sides of said pivot notch, each of said elongate slide grooves extending in a front-rear direction, each of said side plates further having two guide protrusions projecting from said inner surface thereof and respectively disposed on front and rear sides of said pivot hole, said guide protrusions being connected slidably and respectively to said elongate slide grooves.

8. The plugging device as claimed in claim 7, wherein each of said elongate slide grooves has a groove wall formed with a cutout, each of said guide protrusions extending into a respective one of said elongate slide grooves through said cutout.

9. The plugging device as claimed in claim 1, wherein each of said side plates further has a positioning hole proximate to said rear end, said operating rod including two resilient plates respectively disposed on said two opposite ends thereof, and two engaging pieces respectively projecting from outer sides of said resilient plates, each of said engaging pieces being removably engaged to said positioning hole in said respective side plate.

10. A plugging device for driving movement of an electronic component so as to plug and unplug a plug electrical connector of the electronic component into and from a socket electrical connector, said plugging device comprising:

a supporting frame including a front end for receiving the socket electrical connector, a rear end opposite to said front end, and two opposite side plates disposed between said front and rear ends;

two slide members adapted to be connected respectively to two opposite sides of the electronic component, said slide members being connected slidably and respectively to inner surfaces of said side plates; and an operating member including an operating rod, and two levers extending transversely and respectively from two opposite ends of said operating rod along a same direction, each of said levers including a lever body connected to said operating rod, a fulcrum portion having a cylindrical shape and projecting from an outer surface of said lever body, and a resistance portion connected to a respective one of said slide members, each of said side plates having a pivot hole formed in the center thereof, said fulcrum portion of each of said levers being connected pivotally to said pivot hole in a respective one of said side plates;

when said operating member is pivoted rearwardly about said fulcrum portion, said slide members together with the electronic component are driven to slide relative to said supporting frame in a forward direction for plugging the plug electrical connector into the socket electrical connector; and when said operating member is pivoted forwardly about said fulcrum portion, said slide members together with the electronic component are driven to slide relative to said supporting frame in a rearward direction for unplugging the plug electrical connector from the socket electrical connector;

wherein each of said slide members is formed with a pivot notch in the center thereof, said resistance portion of each of said levers having a cylindrical shape and projecting from an inner surface of a respective said lever body, said resistance portion of each of said levers being connected rotatably to said pivot notch in said respective slide member;

wherein each of said slide members is formed with two elongate slide grooves respectively disposed on front and rear sides of said pivot notch, each of said elongate slide grooves extending in a front-rear direction, each of said side plates further having two guide protrusions projecting from said inner surface thereof and respectively disposed on front and rear sides of said pivot hole, said guide protrusions being connected slidably and respectively to said elongate slide grooves.

11. The plugging device as claimed in claim 10, wherein each of said elongate slide grooves has a groove wall formed with a cutout, each of said guide protrusions extending into a respective one of said elongate slide grooves through said cutout.

* * * * *